US 8,154,149 B2

(12) United States Patent
King

(10) Patent No.: US 8,154,149 B2
(45) Date of Patent: Apr. 10, 2012

(54) METHOD AND APPARATUS FOR CHARGING A VEHICLE ENERGY STORAGE SYSTEM

(75) Inventor: Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 12/433,992

(22) Filed: May 1, 2009

(65) Prior Publication Data

US 2010/0276993 A1 Nov. 4, 2010

(51) Int. Cl.
*B60L 1/00* (2006.01)
(52) U.S. Cl. .......................................... 307/9.1; 307/64
(58) Field of Classification Search ............... 307/9.1, 307/64–66
See application file for complete search history.

(56) References Cited

U.S. PATENT DOCUMENTS

| 5,373,195 A | 12/1994 | De Doncker et al. |
| 5,710,699 A | 1/1998 | King et al. |
| 5,834,858 A * | 11/1998 | Crosman et al. ................ 307/66 |
| 5,903,449 A | 5/1999 | Garrigan et al. |
| 7,049,792 B2 | 5/2006 | King |
| 7,456,518 B2 * | 11/2008 | Hjort et al. ...................... 307/64 |
| 7,518,342 B2 * | 4/2009 | Palczynski, Jr. ............... 320/139 |
| 7,737,581 B2 * | 6/2010 | Spurlin et al. .................. 307/66 |
| 7,773,375 B1 * | 8/2010 | Faucett ..................... 361/679.49 |

* cited by examiner

*Primary Examiner* — Fritz M Fleming
(74) *Attorney, Agent, or Firm* — Ziolkowski Patent Solutions Group, SC; Jean K. Testa

(57) ABSTRACT

A propulsion system is provided that includes an energy system, wherein the energy system comprises a first energy storage system electrically coupled to a direct current (DC) link, a bi-directional boost converter electrically coupled to the first energy storage system and to the DC link, and a second energy storage system electrically coupled to the bi-directional boost converter. The propulsion system further comprises an electric drive coupled to the DC link, an auxiliary energy source coupled to the energy system; and a system controller, wherein the system controller is configured to determine an operational status of the first energy storage system and an operational status of the second energy storage system, and if the first and second energy storage systems are determined to be non-operational, then the system controller causes energy from the auxiliary energy source to be supplied to the first energy storage system.

24 Claims, 6 Drawing Sheets

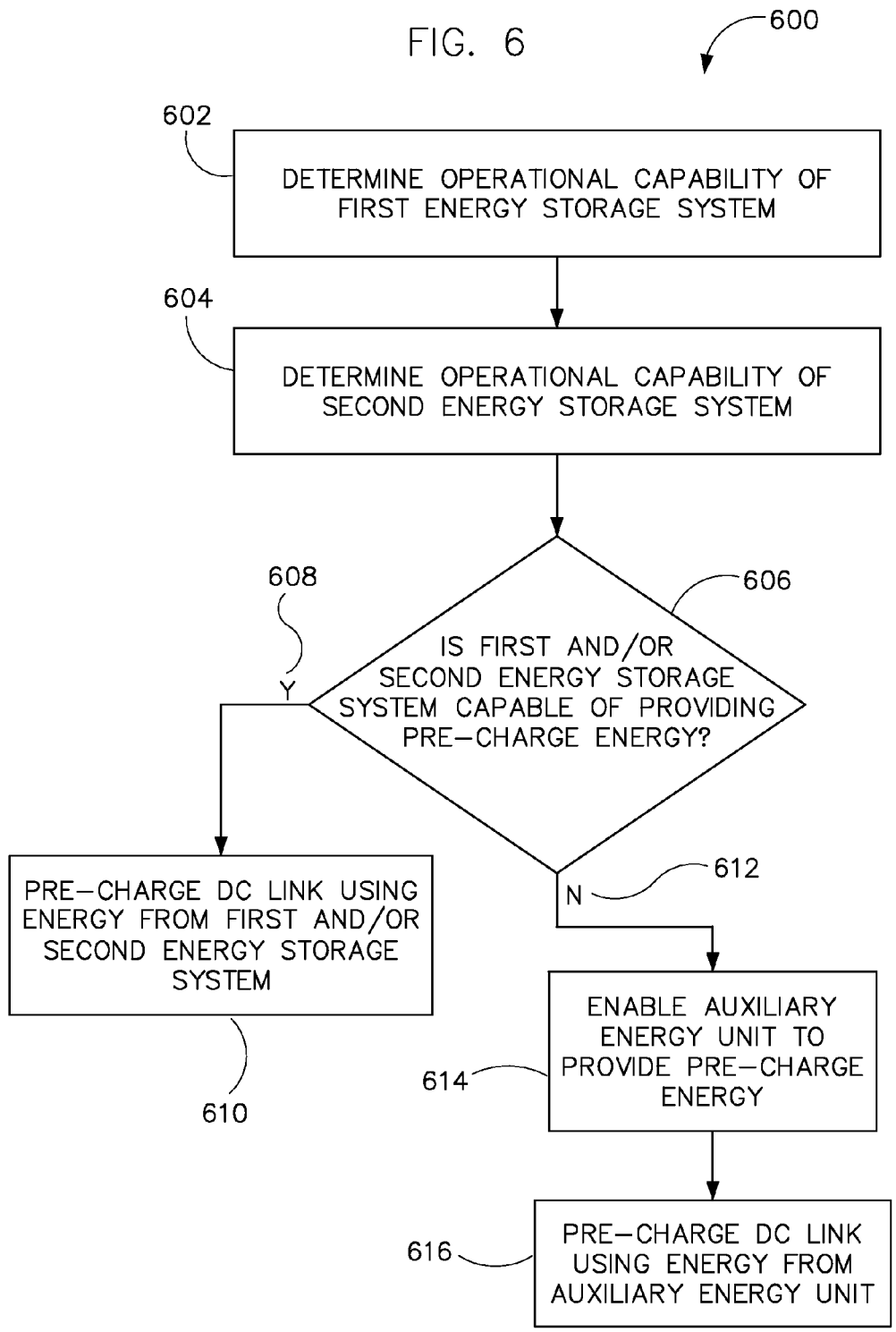

METHOD AND APPARATUS FOR CHARGING A VEHICLE ENERGY STORAGE SYSTEM

BACKGROUND

The invention relates generally to vehicle drive systems, and more specifically to battery powered drive systems such as those used in battery powered electric vehicles, hybrid electric vehicles, or plug-in hybrid electric vehicles.

Electric vehicles and hybrid electric vehicles are typically powered by one or more energy storage devices, either alone or in combination with an internal combustion engine. In pure electric vehicles, the one or more energy storage devices powers the entire drive system, thereby eliminating the need for an internal combustion engine. Hybrid electric vehicles, on the other hand, include energy storage device power to supplement power supplied by an internal combustion engine, which greatly increases the fuel efficiency of the internal combustion engine and of the vehicle.

Traditionally, the energy storage devices in electric or hybrid electric propulsion systems include batteries, ultracapacitors, flywheels, or a combination of these elements in order to provide sufficient energy to power an electric motor. At start-up of the electric or hybrid electric propulsion system, capacitors within the power electronics or energy storage system of the propulsion system are pre-charged to a prescribed value to allow the electric or hybrid drive to be enabled. This pre-charging function is typically provided using energy stored in an on-board energy storage system, such as a traction battery.

While performing the pre-charging function during vehicle start-up via the vehicle's traction battery is often successful, there are many instances where the traction battery is either non-operational, at a low value of state-of-charge (SOC), or has a terminal voltage below a given threshold. During such instances, the traction battery may be unable to provide sufficient pre-charge energy to the capacitors within the power electronics, and thus the electric drive will not operate, in turn rendering the vehicle inoperable.

One common cause for traction batteries using selected technology to become non-operational is that the batteries are often subjected to ambient temperatures below a specified operating temperature for the battery. That is, when an ambient temperature is below a certain temperature for an extended period of time, the traction battery may cool to a point of solidification. The traction battery may also solidify (or enter a "hibernate" mode) if an electric or hybrid electric vehicle is not operated for an extended period of time (e.g., 12-24 hours) or, in the case of a plug-in electric vehicle, not connected to the power grid within a similar period of time. When a traction battery solidifies, it cannot operate to provide sufficient pre-charge energy to the power electronics of the drive system, and thus the vehicle cannot operate. Unfortunately, many low-cost, high-energy batteries utilized for electric and hybrid electric vehicles, such as high-temperature sodium batteries, are only optimally operable at high temperatures. Additionally, even in instances when an ambient temperature is not below the operating temperature of the traction battery, the battery may still be non-operational based on a low state-of-charge (SOC) or an insufficient terminal voltage. Traction battery operational deficiencies adversely affect the conventional pre-charge function of the power electronics, thereby preventing the electric or hybrid electric vehicle from operating at start-up.

When the traction battery (and, in turn, the vehicle itself) is detected as being non-operational, a fault code may be issued to the vehicle's operating system to aid a technician in determining the cause of the malfunction. It is usually not until the vehicle is transported to a repair facility that such a determination can be made. Accordingly, repairs or adjustments in the field by the vehicle's owner are difficult. Such repairs can be quite costly and inconvenient for the owner, who, at the very least, cannot operate the vehicle until the issue is resolved.

Therefore, it is desirable to provide an electric and/or hybrid electric propulsion system having an alternative mode of providing pre-charge energy to the power electronics of the vehicle in the event that the conventional source of pre-charge energy is non-operational.

BRIEF DESCRIPTION OF THE INVENTION

In accordance with one aspect of the invention, a propulsion system is shown comprising an energy system, wherein the energy system comprises a first energy storage system electrically coupled to a direct current (DC) link, a bi-directional boost converter electrically coupled to the first energy storage system and to the DC link, and a second energy storage system electrically coupled to the bi-directional boost converter. The propulsion system further comprises an electric drive coupled to the DC link, an auxiliary energy source coupled to the energy system; and a system controller, wherein the system controller is configured to determine an operational status of the first energy storage system and an operational status of the second energy storage system, and if the first and second energy storage systems are determined to be non-operational, then the system controller causes energy from the auxiliary energy source to be supplied to the first energy storage system.

In accordance with another aspect of the invention, a method of manufacturing a vehicle propulsion system is shown, the method comprising forming a vehicle energy system comprising, coupling a first energy storage system to a direct current (DC) link, coupling at least one of a single-channel bi-directional boost converter and a multi-channel bi-directional boost converter to the DC link, and coupling a second energy storage system to the bi-directional boost converter. The method further comprises coupling an electric drive to the vehicle energy system, coupling an auxiliary energy source to the vehicle energy system, and coupling a system controller to the first energy storage system, the second energy storage system, the bi-directional boost converter, and the auxiliary energy source. The system controller is configured to determine an operational status of the first and second energy storage systems and transfer energy from the auxiliary energy source to the first energy storage system if it is determined that the operational status of the first energy storage system is below a first predetermined threshold and the operational status of the second energy storage systems is below a second predetermined threshold.

In accordance with another aspect of the invention, a vehicle system controller is shown, wherein the vehicle system controller is programmed to determine an operational capability of a first energy storage system electrically coupled to an electric drive via a direct current (DC) link, determine an operational capability of a second energy storage system electrically coupled to a bi-directional boost converter, wherein the bi-directional boost converter is electrically coupled to the DC link, and enable energy to be transferred to the first energy storage system from an auxiliary energy source if it is determined that the operational capability of the first energy storage system is below a first predetermined threshold and the operational capability of the second energy storage system is below a second predetermined threshold.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 6 is a flow chart illustrating the procedure steps of the system controller according to an embodiment of the invention.

DETAILED DESCRIPTION

A system and method is shown for providing an auxiliary energy source configured to transfer energy to an energy storage system of an electric or hybrid electric vehicle during a start-up sequence of the vehicle.

Figure 1:
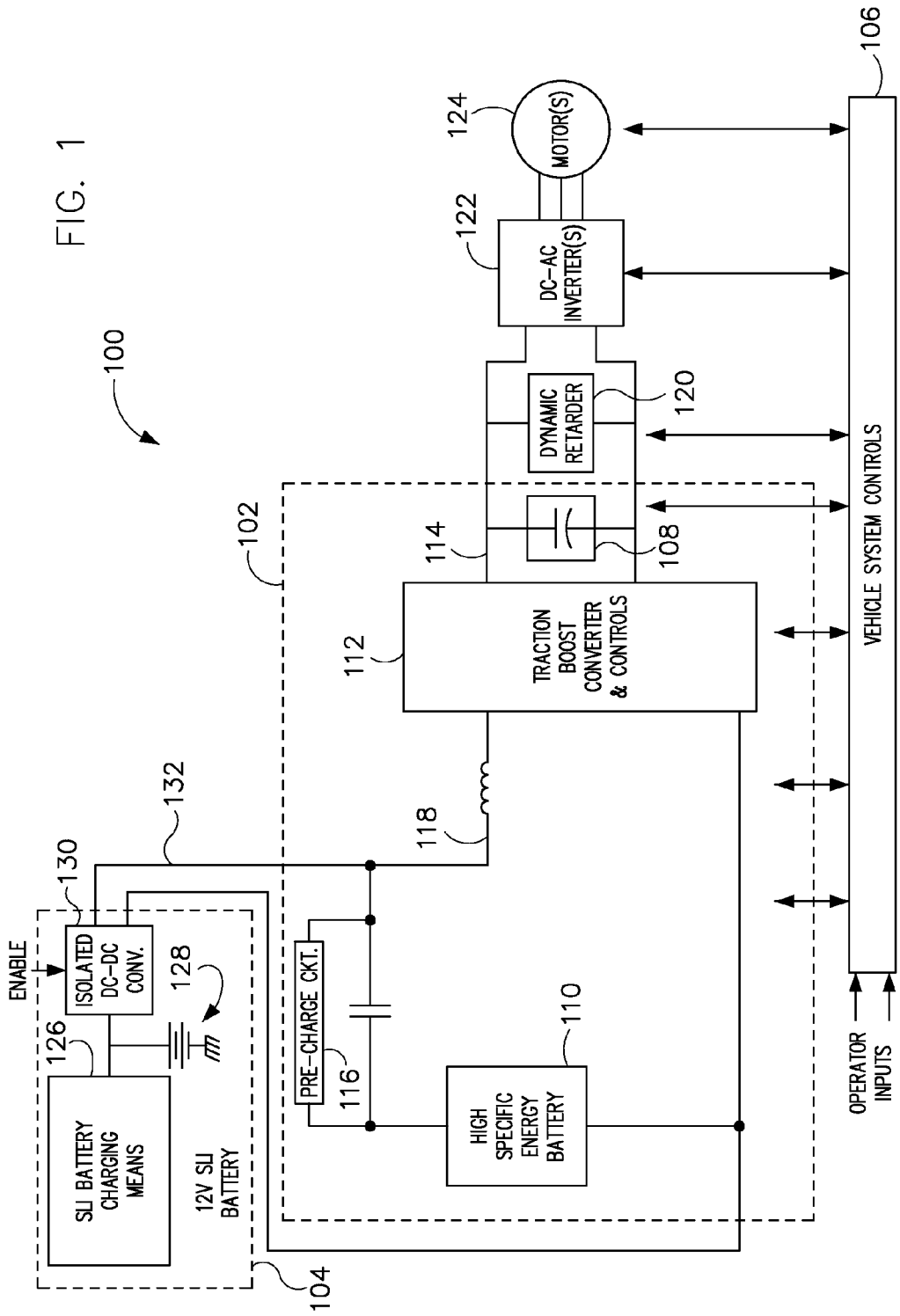
FIG. 1 schematically illustrates an embodiment of the propulsion system according to the invention.

FIG. 1 illustrates a vehicle propulsion system 100 according to an embodiment of the invention. Vehicle propulsion system 100 includes, in part, an energy system 102, an auxiliary energy system 104, and a vehicle system controller 106. Energy system 102 comprises a first energy storage system 108, a second energy storage system 110, and a bi-directional boost converter 112. First energy storage system 108, which comprises at least one of an ultracapacitor, a battery, or a flywheel, is coupled via a direct current (DC) link 114 to a DC-AC inverter 122 and an electric drive 124. Electric drive 124 is preferably an AC motor, but is not limited as such. Second energy storage system 110 is configured to transfer electrical energy to DC link 114 and, in turn, first energy source 108, via bi-directional boost converter 112. In operation, bi-directional boost converter 112 acts to boost the voltage provided by the low voltage side of energy system 102 to the high voltage side of energy system 102. That is, voltage provided via a bus 118 on the low voltage side of energy system 102 is boosted by bi-directional boost converter 112 such that the voltage provided to DC link 114 on the high voltage side of energy system 102 is increased.

Also coupled to DC link 114 is a dynamic retarder 120. Dynamic retarder 120 acts to limit the DC voltage developed on DC link 114 when electric drive 124 is operated in a regenerative mode, wherein electric energy is returned to DC link 114 through DC-AC inverter 122 during a regenerative braking event. During such a regenerative braking event, bi-directional boost converter 112 is configured to dynamically boost the voltage provided via DC link 114 such that an optimal amount of regenerative energy is able to be recaptured and stored in second energy storage system 110.

In order to initiate operation of the vehicle, vehicle propulsion system 100 must first go through a start-up sequence procedure, wherein initial pre-charge energy is provided to first energy storage system 108. Under optimal conditions, first energy storage system 108 receives this initial pre-charge from energy provided via second energy storage system 110. That is, when vehicle system controller 106 receives an operator input to initiate vehicle start-up, vehicle system controller 106 sends a command to second energy storage system 110 to provide pre-charge energy to first energy storage system 108. This energy is provided via a dedicated pre-charge circuit 116 coupled to second energy storage system 110 and to bi-directional boost converter 112 via bus 118. As discussed above, bi-directional boost converter 112 is configured to boost the voltage provided to DC link 114 and, ultimately, first energy storage system 108. When first energy storage system 108 is pre-charged, it is capable of providing energy via DC link 114 to DC-AC inverter 122 and electric drive 124 to initiate vehicle start-up, thereby completing the vehicle's start-up sequence procedure.

While second energy storage system 110 is capable of providing sufficient energy to pre-charge first energy storage system 108 under optimal conditions, there are times when second energy storage system 110 is incapable of providing pre-charge energy. That is, second energy storage system 110 often comprises a high specific-energy battery, such as a sodium-based battery, which may become non-operational (or insufficiently operational) for a variety of reasons. Examples of such reasons include second energy storage system 110 being at a low value of state-of-charge (SOC), the terminal voltage of second energy storage system 110 being below a predetermined threshold, and/or the temperature of second energy storage system 110 being below a specified operating temperature. Additionally, if the vehicle is not operated for an extended period of time and is not connected to an alternate power source, the high specific-energy battery of second energy storage system 110 may "solidify," causing second energy storage system 110 to become entirely non-operational. In such instances, first energy storage system 108 cannot be pre-charged by second energy storage system 110 until further action is taken, and thus the vehicle start-up sequence cannot be completed, thereby disabling the vehicle.

The present embodiment, however, provides an alternative source for pre-charging first energy storage system 108 in the event that second energy storage system 110 is completely or insufficiently non-operational, is at a low value of state-of-charge (SOC), is at a low value of output voltage, or is at a temperature below the specified operating temperature. This alternative source of pre-charging energy is in the form of auxiliary energy system 104 coupled to energy system 102. As FIG. 1 illustrates, auxiliary energy system 104 may comprise a starting, lighting, and ignition (SLI) battery charging means 126, an SLI battery 128, and a DC-DC converter with galvanic isolated output 130, commonly known as an isolated DC-DC converter. SLI battery charging means 126 may be any device that provides electrical energy, such as a conventional vehicle alternator or a plug-in charging means. SLI battery 128 may be a conventional voltage battery (for example, 12 volts), which can typically be found in most light duty electric or hybrid-electric vehicles. SLI battery voltage for buses and some trucks, on the other hand, may be on the order of 24 volts. Energy from SLI battery 128 and/or SLI battery charging means 126 is provided through isolated DC-DC converter 130 to energy system 102 via a bus 132. Bus 132 is coupled to bus 118 of energy system 102 such that energy provided by auxiliary energy source 104 can be transferred to first energy storage system 108 via bi-directional boost converter 112.

Still referring to FIG. 1, vehicle system controller 106 is configured to determine the operational capability of energy system 102. Specifically, when vehicle system controller 106 receives a start-up command from the operator of the vehicle, vehicle system controller 106 determines if first energy storage system 108 has sufficient operational capability to commence the start-up sequence procedure. Vehicle system controller also determines if second energy storage system 110 has sufficient operational capability to pre-charge first energy storage system 108. If neither first energy storage system 108 nor second energy storage system 110 is capable of providing sufficient energy to achieve vehicle start-up, vehicle system controller 106 is configured to send a command to auxiliary energy source 104 to provide pre-charge energy to first energy source 108. In this way, the vehicle start-up sequence procedure can be successfully completed, regardless of the operational capability of both first energy storage system 108 and second energy storage system 110 at receipt of the vehicle start-up command.

Furthermore, auxiliary energy source 104 may also be configured to provide energy to second energy source 110 such that second energy source 110 can be brought to an acceptable operating temperature via a dedicated heater (not shown), a sufficient state-of-charge (SOC), or be capable of providing a sufficient value of output voltage. When second energy source 110 is determined to be at a sufficient operational capability, energy from auxiliary energy source 104 may no longer be needed to enable operation of electric drive 124, and thus vehicle propulsion system 100 may then operate solely through energy provided by energy system 102.

Figure 2:
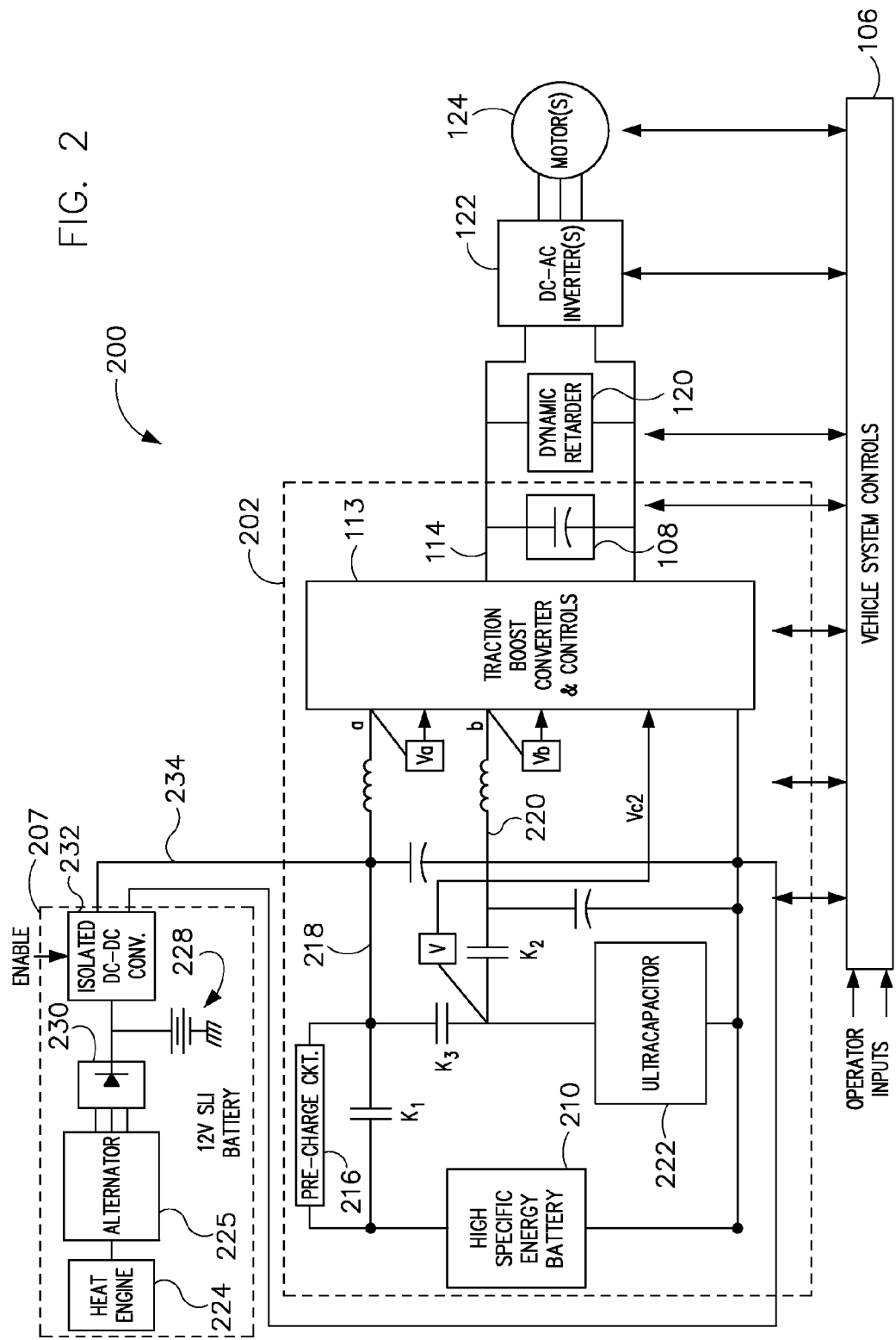
FIG. 2 schematically illustrates another embodiment of the propulsion system according to the invention.

Referring now to FIG. 2, another embodiment according to the invention is shown. Similar to vehicle propulsion system 100 illustrated in FIG. 1, vehicle propulsion system 200 includes, in part, an energy system 202, an auxiliary energy system 204, and a vehicle system controller 106. Energy system 202 includes a first energy storage system 108 and a second energy storage system comprising a high specific-energy battery 210 and an ultracapacitor 222. Energy system 202 includes a multi-channel bi-directional boost converter 113, which is similar to bi-directional boost converter 112 described above with respect to FIG. 1 but has multiple channels through which energy can be provided, as opposed to a single channel. First energy storage system 108, which comprises an energy storage device (such as an ultracapacitor), is coupled via DC link 114 to DC-AC inverter 122 and electric drive 124. The combination of high specific-energy battery 210 and ultracapacitor 222 is configured to transfer electrical energy via busses 218, 220 to multi-channel bi-directional boost converter 113 at channels "a" and "b", respectively, which in turn provides boosted voltage to DC link 114 and first energy source 108. The electrical energy provided via multi-channel bi-directional boost converter 113 is dynamically controlled and is dependent upon the charge capacity and requirements of first energy storage system 108, high specific energy battery 210, and/or ultracapacitor 222.

Additionally, when electric drive 124 operates in a regenerative braking mode, vehicle propulsion system 200 is configured to deliver the regenerative electrical energy through multi-channel bi-directional boost converter 113 via DC link 114, wherein the electrical energy is then recaptured and stored in at least one of first energy storage system 108, high specific-energy battery 210, and ultracapacitor 222. Conventionally, in a system with only a high specific-energy battery coupled through a multi-channel bi-directional boost converter, a significant portion of the regenerative energy would have to be captured in the high specific-energy battery through increased current. Thus, high losses would be experienced both in the high specific-energy battery's internal resistance and also in the bi-directional boost converter due to a limit in the amount of charge acceptance and voltage limits of the high-specific energy battery. However, under the configuration shown in FIG. 2, the losses in both the multi-channel bi-directional boost converter 113 and high specific-energy battery 210 are greatly reduced. That is, the configuration of ultracapacitor 222 and high specific-energy battery 210 enables much of the regenerated energy to be captured in ultracapacitor 222, rather than relying upon only high specific-energy battery 210 to capture regenerated energy. Unlike high specific-energy battery 210, ultracapacitor 222 is operable at a low state-of-charge (SOC) and is capable of rapid high-rate electrical charge acceptance. As such, ultracapacitor 222 is capable of accepting much of the regenerative power from the high voltage regenerated energy generated by electric drive 124 during vehicle deceleration, resulting in lower electrical loss and thermal cycling stresses within multi-channel bi-directional boost converter 113 and high specific-energy battery 210, which thereby improves the overall efficiency of vehicle propulsion system 200. An additional amount of regenerated energy is captured in first energy storage system 108 as the voltage level of DC link 114 is increased.

As with vehicle propulsion system 100 discussed above with respect to FIG. 1, vehicle propulsion system 200 must enter a start-up sequence procedure when an operator inputs a vehicle start-up command to vehicle system controller 106. Ideally, first energy storage system 108 will receive initial pre-charge from energy provided via at least one of high specific-energy battery 210 and ultracapacitor 222. When vehicle system controller 106 receives an operator input to initiate vehicle start-up, vehicle system controller 106 sends a command to at least one of high specific-energy battery 210 and ultracapacitor 222 to provide pre-charge energy to first energy storage system 108. This energy is provided via a dedicated pre-charge circuit 216, which is coupled to multi-channel bi-directional boost converter 112 via bus 218. When first energy storage system 108 is pre-charged, the vehicle start-up sequence procedure can be completed.

While either or both of high specific-energy battery 210 and ultracapacitor 222 is capable of providing sufficient energy to pre-charge first energy storage system 108 under optimal conditions, there are instances where these energy storage devices are incapable of providing sufficient pre-charge energy. As discussed above with respect to high specific energy battery 110, high specific-energy battery 210 may become non-operational (or insufficiently operational) when it is at a low value of state-of-charge (SOC), the terminal voltage is below a predetermined threshold, and/or the temperature of high specific-energy battery 210 is below a specified operating temperature. Similarly, ultracapacitor 222 may be at an insufficient state-of-charge (SOC) or be non-operational for other reasons, thereby rendering ultracapacitor 222 unable to provide pre-charge energy to first energy storage system 108. In such instances, the vehicle start-up sequence cannot be completed by a traditional pre-charge method. Thus, vehicle propulsion system 200 is configured to provide an auxiliary energy source 204 to transfer pre-charge energy to first energy storage system 108, as will be discussed below.

As FIG. 2 illustrates, auxiliary energy system 207 comprises a heat engine (or internal combustion engine) 224, an engine-driven alternator 225, an SLI battery 228, a rectifier 230, and a galvanic isolated DC-DC converter 232. Electrical energy from alternator 225 and/or SLI battery 228 is provided through isolated DC-DC converter 232 to energy system 202 via bus 234. Bus 234 is coupled to bus 218 of energy system 202 such that energy provided by auxiliary energy source 207 can be transferred to first energy storage system 108 via multi-channel bi-directional boost converter 113. When vehicle system controller 106 receives a start-up command from the operator of the vehicle, vehicle system controller 106 determines if first energy storage system 108 has sufficient operational capability to commence the start-up sequence procedure, as was similarly discussed above with respect to FIG. 1. Vehicle system controller 106 also determines if high specific-energy battery 210 and ultracapacitor 222 have sufficient operational capability to pre-charge first energy storage system 108. If first energy storage system 108, high specific-energy battery 210, and ultracapacitor 222 are incapable of providing sufficient energy to achieve vehicle start-up, vehicle system controller 106 is configured to send a command to auxiliary energy source 207 to provide pre-charge energy to first energy source 108. Electrical energy is then transferred from isolated DC-DC converter 232 to bus 218 and/or bus 220 of energy system 202, thereby providing a pre-charge energy to first energy storage system 108. Thus, the vehicle start-up sequence procedure can be successfully completed, even without the conventional pre-charge operability of energy system 202.

Figure 3:
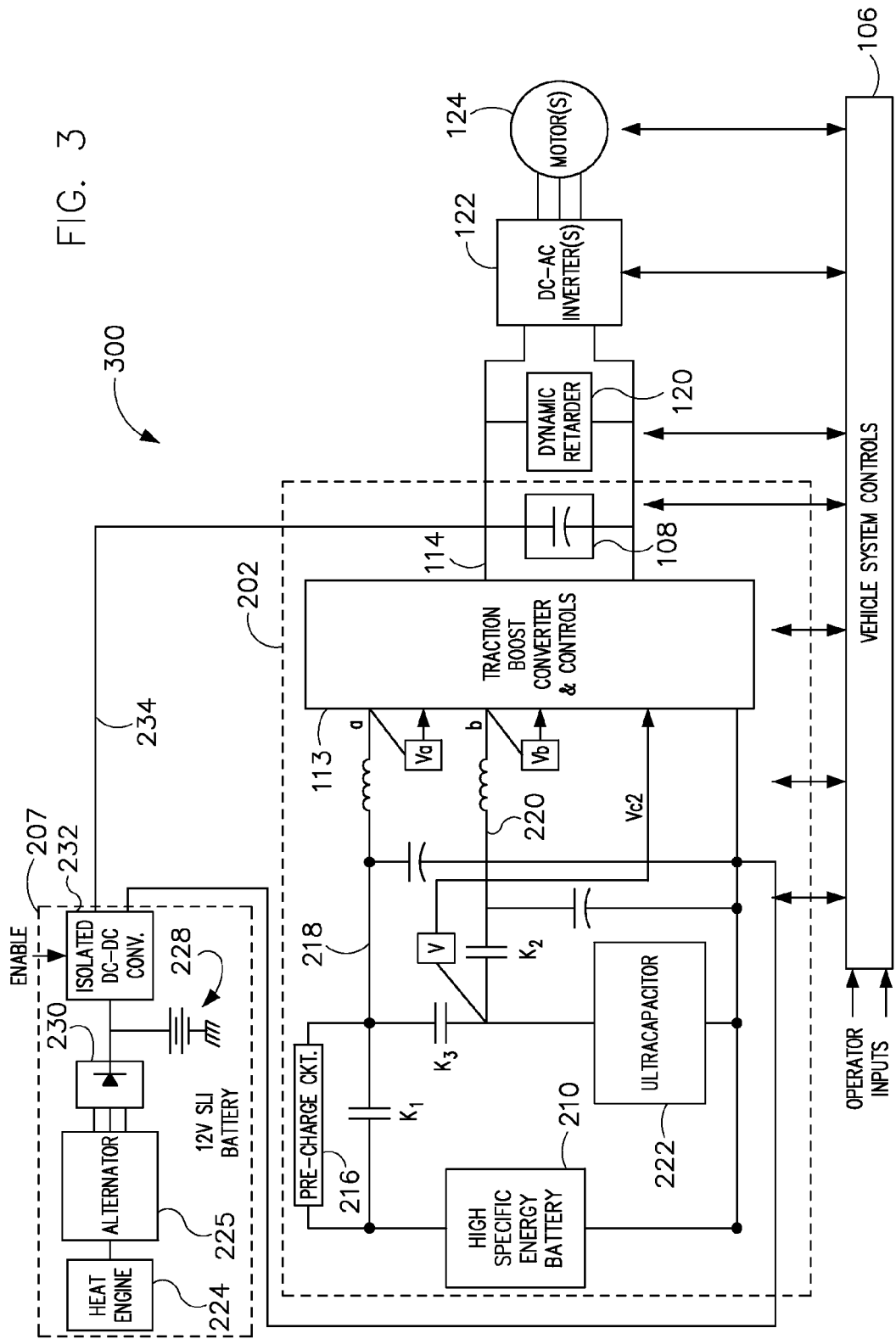
FIG. 3 schematically illustrates another embodiment of the propulsion system according to the invention.

Next, referring to FIG. 3, another embodiment according to the invention is shown. As can be seen by FIG. 3, vehicle propulsion system 300 comprises identical structural elements as are shown with respect to vehicle propulsion system 200 in FIG. 2. Thus, the description of those elements will not be repeated herein. Unlike vehicle propulsion system 200, however, auxiliary energy system 207 of vehicle propulsion system 300 is electrically coupled directly to DC link 114 and first energy storage system 108 via bus 234. That is, rather than providing auxiliary pre-charge energy through multi-channel bi-directional boost converter 113, auxiliary energy system 207 provides pre-charge energy directly to first energy storage system 108 when a command is received from vehicle system controller 106 signifying the necessity of such auxiliary energy. As the electrical energy does not pass through multi-channel bi-directional boost converter 113, the voltage is not "boosted, and therefore it may be desirable to provide an isolated DC-DC converter 232 with a higher voltage rating than that utilized in vehicle propulsion system 200. In this way, a sufficient voltage level to pre-charge first energy storage system 108 can be provided directly from auxiliary energy system 207.

While not shown in FIGS. 2 and 3, it is to be understood that heat engine 224 of auxiliary energy system 207 can be connected directly to a conventional drive train through a transmission (not shown) of the vehicle, thus in one embodiment bypassing connection through electric drive 124. In this way, vehicle propulsion systems 200 and 300 illustrated in FIGS. 2 and 3 may operate in a parallel hybrid fashion, wherein the vehicle is mobilized via heat engine 224, electric drive 124, or a combination thereof.

Figure 4:
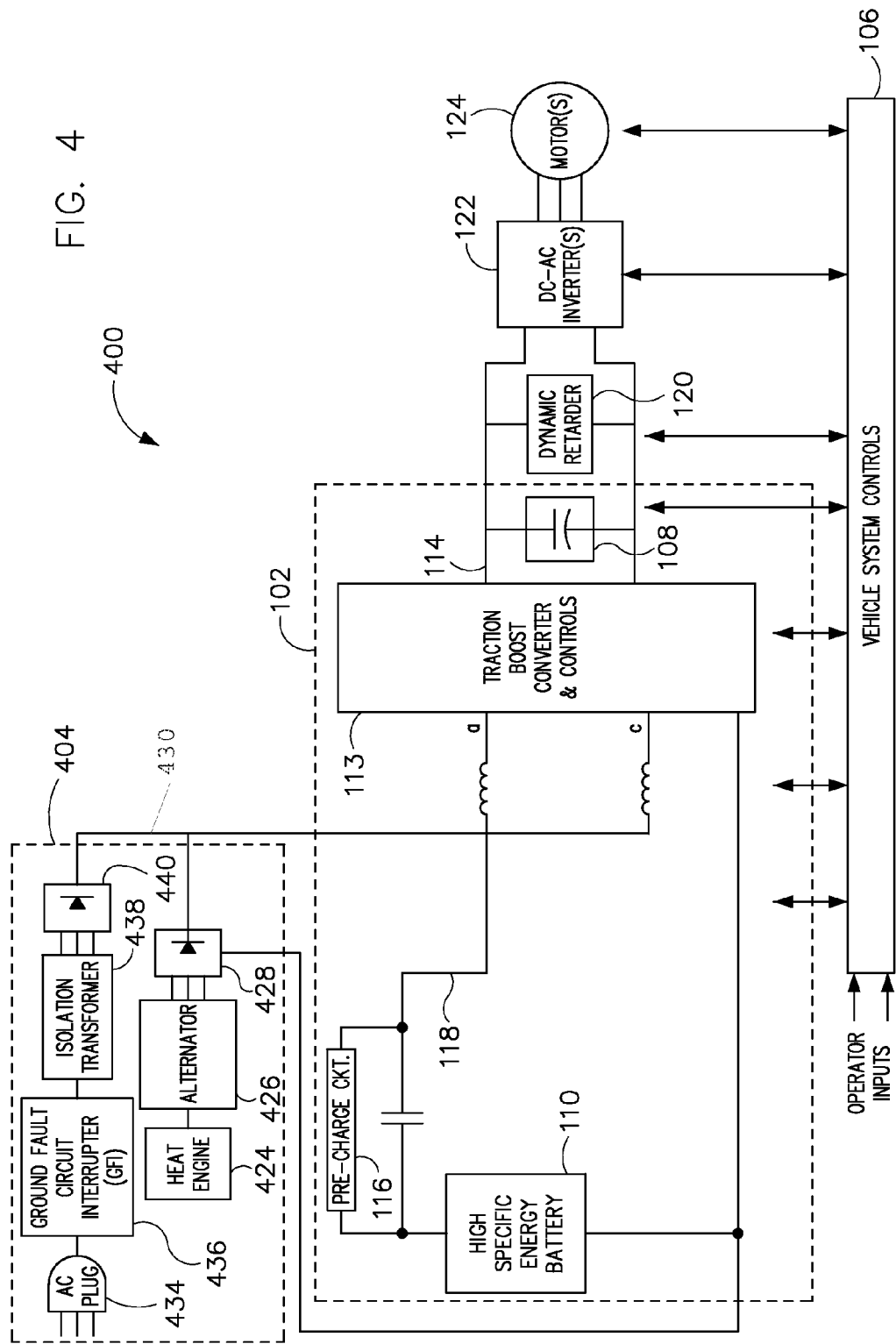
FIG. 4 schematically illustrates another embodiment of the propulsion system according to the invention.

Referring now to FIG. 4, another embodiment according to the invention is illustrated. Vehicle propulsion system 400 comprises substantially the same elements as vehicle propulsion system 100 shown in FIG. 1 and described above. However, unlike vehicle propulsion system 100, auxiliary energy system 404 of vehicle propulsion system 400 is coupled with energy system 102. That is, auxiliary energy system 404 is coupled to multi-channel bi-directional boost converter 113 through bus 430 such that all energy output from auxiliary energy system 404 is transferred though multi-channel bi-directional boost converter 113 at channel "c" to DC link 114. As FIG. 4 shows, auxiliary energy system 404 comprises a heat engine (or internal combustion engine) 424, an alternator 426, and a rectifier 428 having galvanic isolation. Electrical windings of alternator 426 have galvanic isolation with respect to both the frame of the alternator and the frame of the vehicle. Electrical energy from alternator 426 is delivered through rectifier 428 to assist in powering electric drive 124. Auxiliary energy system 404 may also comprise a plug-in electrical system comprising an AC plug 434, a ground fault current interrupter (GFI) 436, an isolation transformer 438, and a rectifier 440 having galvanic isolation from the other systems of vehicle propulsion system 400. When the vehicle powered by system 400 is not under operation, AC plug 434 can be coupled to an external electrical power source (i.e., utility grid) to supply energy through rectifier 440 to the multi-channel bi-directional boost converter 113.

As with vehicle propulsion system 100 above, vehicle system controller 106 is configured to determine the operational capability of both high specific-energy battery 110 and first energy storage system 108. For example, if vehicle system controller 106 receives a command from the operator to disable or shutdown during a time when the system is operational, and then a very short time later vehicle system controller 106 receives a command to pre-charge energy storage system 108, pre-charge function may not be required. Alternatively, if neither high specific-energy battery 110 nor first energy storage system 108 is capable of providing a sufficient pre-charge, vehicle system controller 106 is configured to enable energy provided by auxiliary energy system 404 to pre-charge first energy storage system 108 such that a vehicle start-up sequence procedure can be completed. This pre-charge energy can be provided by auxiliary energy system 404 either via the plug-in interface when the vehicle is connected to an external electrical power source, or by way of the heat engine and engine-driven alternator. In this way, total reliance on the operability of one or both of first energy storage system 108 and high specific-energy battery 110 to achieve a successful pre-charge sequence can be avoided.

Figure 5:
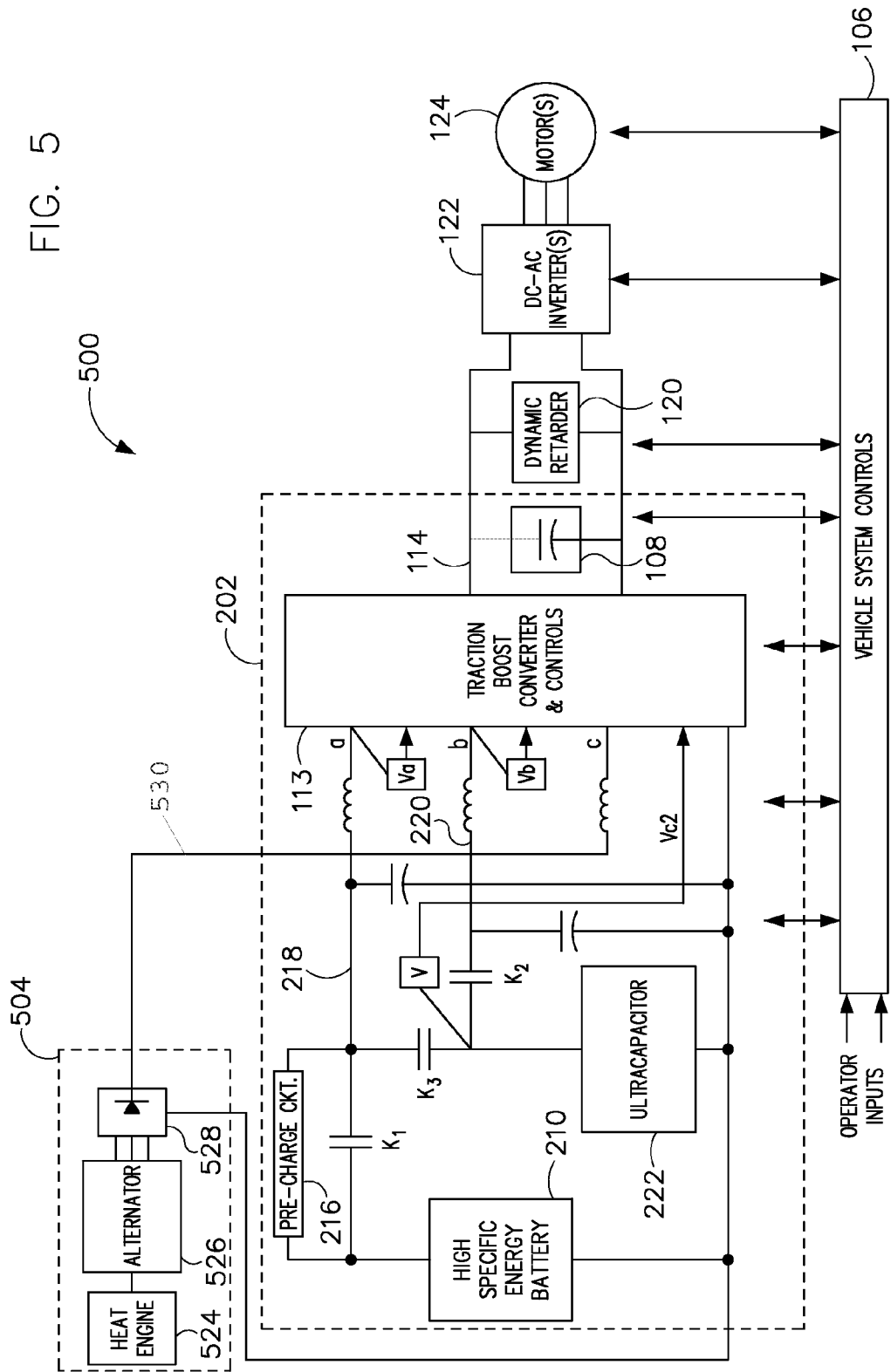
FIG. 5 schematically illustrates another embodiment of the propulsion system according to the invention.

FIG. 5 illustrates yet another embodiment according to the invention. Vehicle propulsion system 500 comprises substantially the same elements shown and described above in FIG. 2 with respect to vehicle propulsion system 200. Therefore, the function and description of these elements will not be repeated herein. FIG. 5, however, shows an auxiliary energy system 504 coupled with energy system 202, similar to the configuration described above with respect to FIG. 4. Auxiliary energy system 504 is coupled to multi-channel bi-directional boost converter 113 through bus 530 such that all energy output from auxiliary energy system 504 is transferred though multi-channel bi-directional boost converter 113 at channel "c" to DC link 114. Auxiliary energy system 504 comprises a heat engine (or internal combustion engine) 524, an alternator 526, and a rectifier 528. Once again, electrical energy from alternator 526 is delivered through rectifier 528 to assist in powering electric drive 124. As was discussed above with respect to FIG. 2, vehicle system controller 106 determines whether or not high specific-energy battery 210, ultracapacitor 222, and first energy storage system 108 are capable of providing sufficient energy to complete a pre-charge operation at vehicle start-up. In the event that none of high specific-energy battery 210, ultracapacitor 222, or first energy storage system 108 is capable of providing a sufficient pre-charge, vehicle system controller 106 is configured to enable energy provided by auxiliary energy system 504 to pre-charge first energy storage system 108. Once again, the presence of auxiliary energy system 504 allows for a back-up energy source to provide electrical energy to complete a vehicle start-up sequence procedure in the event that conventional energy storage systems are either non-operational or incapable of providing sufficient pre-charge energy.

Referring now to FIG. 6, a flowchart 600 describing the operation of the vehicle system controller according to the invention is shown. At step 602, the vehicle system controller determines the operational capability of a first energy storage system. That is, it is determined whether or not the charge capacity of the first energy storage system is greater than a predetermined threshold, or whether the first energy storage system is operable at all. Next, at step 604, the vehicle system controller similarly determines the operational capability of a second energy storage system. Again, it is determined if the second energy storage system is operational, and if so, it is determined if the charge capacity of the second energy storage system is greater than a predetermined threshold. At step 606, the vehicle system controller determines if either or both of the first and second energy storage systems are capable of providing a pre-charge energy to initiate a vehicle start-up sequence. If so 608, then the DC link coupled to an electric drive of the vehicle is pre-charged such that the vehicle start-up sequence is completed. However, if neither of the first or second energy storage systems is capable of providing a pre-charge energy to initiate a vehicle start-up sequence 612, then the vehicle system controller is configured to enable an auxiliary energy unit to provide pre-charge energy to the DC link at step 614. Then, at step 616, the DC link is pre-charged using energy from the auxiliary energy unit, thus completing the start-up sequence of the vehicle using an alternate energy source.

A technical contribution for the disclosed method and apparatus provides for a computer-implemented device capable of controlling operation of a vehicle propulsion system. The computer-implemented device controls operation of the vehicle energy storage system(s) and auxiliary energy system(s) such that a pre-charge sequence at vehicle start-up is completed, regardless of the operational capability of the energy storage system(s).

As is set forth above, one aspect of the invention shows a propulsion system comprising an energy system, wherein the energy system comprises a first energy storage system electrically coupled to a direct current (DC) link, a bi-directional boost converter electrically coupled to the first energy storage system and to the DC link, and second energy storage system electrically coupled to the bi-directional boost converter. The propulsion system further comprises an electric drive coupled to the DC link, an auxiliary energy source coupled to the energy system; and a system controller, wherein the system controller is configured to determine an operational status of the first energy storage system and an operational status of the second energy storage system, and if the first and second energy storage systems are determined to be non-operational, then the system controller causes energy from the auxiliary energy source to be supplied to the first energy storage system.

In accordance with another aspect of the invention, a method of manufacturing a vehicle propulsion system is shown, the method comprising forming a vehicle energy system comprising, coupling a first energy storage system to a direct current (DC) link, coupling at least one of a single-channel bi-directional boost converter and a multi-channel bi-directional boost converter to the DC link, and coupling a second energy storage system to the bi-directional boost converter. The method further comprises coupling an electric drive to the vehicle energy system, coupling an auxiliary energy source to the vehicle energy system, and coupling a system controller to the first energy storage system, the second energy storage system, the bi-directional boost converter, and the auxiliary energy source. The system controller is configured to determine an operational status of the first and second energy storage systems and transfer energy from the auxiliary energy source to the first energy storage system if it is determined that the operational status of the first energy storage system is below a first predetermined threshold and the operational status of the second energy storage systems is below a second predetermined threshold.

In accordance with another aspect of the invention, a vehicle system controller is shown, wherein the vehicle system controller is programmed to determine an operational capability of a first energy storage system electrically coupled to an electric drive via a direct current (DC) link, determine an operational capability of a second energy storage system electrically coupled to a bi-directional boost converter, wherein the bi-directional boost converter is electrically coupled to the DC link, and enable energy to be transferred to the first energy storage system from an auxiliary energy source if it is determined that the operational capability of the first energy storage system is below a first predetermined threshold and the operational capability of the second energy storage system is below a second predetermined threshold.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propulsion system comprising:
    an energy system comprising:
        a first energy storage system electrically coupled to a direct current (DC) link;
        a bi-directional boost converter electrically coupled to the first energy storage system and to the DC link; and
        a second energy storage system electrically coupled to the bi-directional boost converter;
    an electric drive coupled to the DC link;
    an auxiliary energy source coupled to the energy system; and
    a system controller configured to:
        determine an operational status of the first energy storage system and an operational status of the second energy storage system; and
        if the first and second energy storage systems are determined to be non-operational, then cause energy from the auxiliary energy source to be supplied to the first energy storage system.

2. The propulsion system of claim 1 wherein the auxiliary energy source comprises an internal combustion engine-driven alternator.

3. The propulsion system of claim 2 wherein the auxiliary energy source comprises an internal combustion engine-driven alternator coupled to a rectifier.

4. The propulsion system of claim 3 wherein the auxiliary energy source further comprises a starting, lighting, and ignition (SLI) battery coupled to the internal combustion engine-driven alternator.

5. The propulsion system of claim 1 wherein the auxiliary energy source is electrically coupled to the at least one of a single-channel bi-directional boost converter and a multi-channel bi-directional boost converter and comprises an internal combustion engine-driven alternator, a rectifier, a starting, lighting, and ignition (SLI) battery and a DC-DC converter having galvanic isolation, and wherein the system controller is further configured to couple the auxiliary energy source to the DC link via the bi-directional boost converter if the first and second energy storage systems are determined to be non-operational.

6. The propulsion system of claim 1 wherein the auxiliary energy source is electrically coupled to the at least one of a single-channel bi-directional boost converter and a multi-channel bi-directional boost converter and comprises an internal combustion engine-driven alternator containing windings having galvanic isolation with respect to a frame of the alternator and a rectifier having galvanic isolation with respect to a frame of a vehicle, and wherein the system controller is further configured to couple the auxiliary energy source to the DC link via the bi-directional boost converter if the first and second energy storage systems are determined to be non-operational.

7. The propulsion system of claim 1 wherein the auxiliary energy source comprises a plug-in electrical interface.

8. The propulsion system of claim 1 wherein the first energy storage system comprises an ultracapacitor.

9. The propulsion system of claim 1 wherein the first energy storage system comprises at least one of a battery, an ultracapacitor, and a flywheel.

10. The propulsion system of claim 1 wherein the second energy storage system comprises a high specific energy battery.

11. The propulsion system of claim 10 wherein the high specific energy battery is a sodium-based battery.

12. The propulsion system of claim 10 wherein the second energy storage system further comprises at least one ultracapacitor electrically coupled to the high specific energy battery.

13. The propulsion system of claim 1 wherein the bi-directional boost converter is a multi-channel bi-directional boost converter.

14. The propulsion system of claim 1 wherein the system controller is further configured to dynamically control an amount of energy transferred to the first energy storage system from the second energy storage system via the bi-directional boost converter if the first and second energy storage systems are determined to be operational.

15. A method of manufacturing a vehicle propulsion system, the method comprising:
forming a vehicle energy system comprising:
coupling a first energy storage system to a direct current (DC) link;
coupling at least one of a single-channel bi-directional boost converter and a multi-channel bi-directional boost converter to the DC link; and
coupling a second energy storage system to the bi-directional boost converter;
coupling an electric drive to the vehicle energy system;
coupling an auxiliary energy source to the vehicle energy system; and
coupling a system controller to the first energy storage system, the second energy storage system, the bi-directional boost converter, and the auxiliary energy source;
configuring the system controller to:
determine an operational status of the first and second energy storage systems; and
transfer energy from the auxiliary energy source to the first energy storage system if it is determined that the operational status of the first energy storage system is below a first predetermined threshold and the operational status of the second energy storage systems is below a second predetermined threshold.

16. The method of claim 15 wherein coupling the auxiliary energy source to the vehicle energy system comprises coupling the auxiliary energy source to the bi-directional boost converter, and wherein configuring the system controller to transfer energy comprises configuring the system controller to transfer energy from the auxiliary energy source to the first energy storage system via the bi-directional boost converter.

17. The method of claim 15 wherein configuring the system controller to determine the operational status of the second energy storage system comprises configuring the system controller to determine the operational status of the second energy storage system based on at least one of a state-of-charge (SOC), an output voltage level, and an operating temperature of the second energy storage system.

18. The method of claim 15 further comprising configuring the system controller to transfer energy from the auxiliary energy source to the second energy storage system if it is determined that the operational status of the second energy storage system is below the second predetermined threshold.

19. The method of claim 15 further comprising configuring the system controller to cause the electric drive to provide regenerative energy to the first energy storage system and to the second energy storage system during a regenerative braking event.

20. A vehicle system controller programmed to:
determine an operational capability of a first energy storage system electrically coupled to an electric drive via a direct current (DC) link;
determine an operational capability of a second energy storage system electrically coupled to a bi-directional boost converter, wherein the bi-directional boost converter is electrically coupled to the DC link; and
enable energy to be transferred to the first energy storage system from an auxiliary energy source if it is determined that the operational capability of the first energy storage system is below a first predetermined threshold and the operational capability of the second energy storage system is below a second predetermined threshold.

21. The vehicle system controller of claim 20 further programmed to enable the auxiliary energy source to transfer energy to the first energy storage system via the bi-directional boost converter if it is determined that the operational capability of the first energy storage system is below a first predetermined threshold and the operational capability of the second energy storage system is below a second predetermined threshold.

22. The vehicle system controller of claim 20 further programmed to enable the auxiliary energy source to transfer energy to the second energy storage system if it is determined that the operational capability of the second energy storage system is below a second predetermined threshold.

23. The vehicle system controller of claim 20 wherein the vehicle system controller is configured to determine the operational capability the second energy storage system based on at least one of a state-of-charge (SOC), an output voltage level, and an operating temperature of the second energy storage system.

24. The vehicle system controller of claim 20 wherein the vehicle system controller is configured to determine the operational capability of the first energy storage system and the second energy storage system at the initiation a vehicle start-up sequence procedure.

* * * * *